Figure 1:
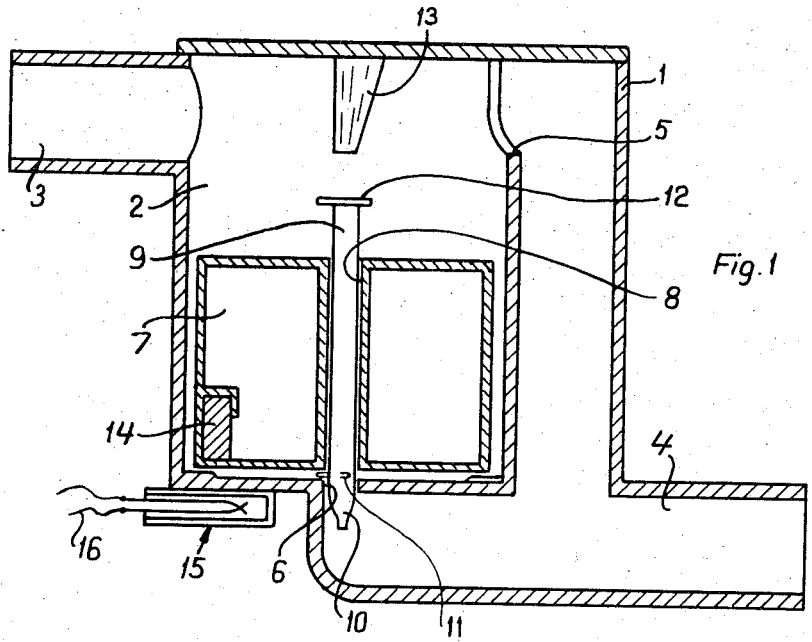

United States Patent [19]
Nilsson

[11] 3,832,970
[45] Sept. 3, 1974

[54] FLOW INDICATOR

[75] Inventor: Rutger Einar Viktor Nilsson, Sodertalije, Sweden

[73] Assignee: Alfa-Laval AB, Tumba, Sweden

[22] Filed: Nov. 27, 1972

[21] Appl. No.: 309,725

[30] Foreign Application Priority Data
Dec. 3, 1971 Sweden.............................. 15533/71
May 12, 1972 Sweden............................... 6305/72

[52] U.S. Cl............................................. 116/117 R
[51] Int. Cl............................................. G01f 15/00
[58] Field of Search................ 116/118, 117 R, 125; 73/305, 308, 313, 319, 221, 208; 119/14.14, 14.15; 417/125

[56] References Cited
UNITED STATES PATENTS
654,441  7/1900  Cook .................................. 73/225
1,148,943  8/1915  Young ................................ 73/225
2,010,621  8/1935  Bassett et al....................... 417/125
3,415,119  12/1968  Moore :............................... 73/208

Primary Examiner—Louis J. Capozi
Attorney, Agent, or Firm—Cyrus S. Hapgood

[57] ABSTRACT

During a small liquid flow to the indicator chamber, the liquid level therein is low due to a bottom outlet having capacity for only the small flow; and when a large flow to the chamber causes the liquid to rise to a high level, liquid also discharges through an outlet of large capacity. A device is provided to indicate which of the two levels prevails in the chamber; and means are also provided for increasing the through-flow area of the bottom outlet in response to the large liquid flow to the chamber, thereby allowing discharge of accumulated particles which could not pass through this outlet during the small liquid flow.

6 Claims, 4 Drawing Figures

3,832,970

FLOW INDICATOR

THE DISCLOSURE

The present invention relates to flow indicators of the type in which the chamber for receiving the liquid flow has one constantly open outlet at the bottom with a capacity for only a relatively small liquid flow, whereby the liquid surface in the chamber is kept at a low level when a relatively small liquid flow enters the chamber, the latter also having a second outlet which functions when the liquid surface in the chamber rises to a high level, that is, when a relatively large liquid flow enters the chamber. Flow indicators of this type have a device for indicating which amount of liquid is present in the chamber, this indication being taken as a base for the magnitude of the liquid flow through the chamber.

Flow indicators of this type, which are used particularly in farms for indicating the flow of milk from a cow, have the very serious disadvantage that the aforesaid chamber constitutes a trap for particles accompanying the milk on its way to a receptacle. Especially such particles as hair from the cow cannot leave the chamber through the small outlet situated at the bottom of the chamber. A few pieces of hair form an effective obstacle to passage of other particles through this outlet, which after a period of time will be blocked. Since the chamber usually contains a float constituting part of the indicating device, it has proved difficult and often impossible to remove hair and other particles from the chamber in connection with the normal washing and rinsing of the flow indicator after each occasion when it is used. Particles consequently remain in the flow indicator during several milking occasions, which is unacceptable from the hygienic point of view. Due to the risk of total blocking of the chamber bottom outlet, the flow indicator also will be less reliable, as such a blocking will cause it to indicate a full milk flow through the chamber even if this flow in reality has ceased entirely. Especially disadvantageous is an incorrect indication of this kind in cases where the flow indicator is used as a means for initiating automatic stopping of the milking operation when the milk flow from the cow ceases.

The principal object of the present invention is to eliminate the above-mentioned disadvantage in connection with flow indicators of the type described.

This object is accomplished according to the invention by means of an arrangement comprising a valve member which cooperates with the outlet for a small liquid flow and which is movable between positions where it uncovers a greater or smaller through-flow area of this outlet, and a float arranged to bias the valve member upon an increase of the liquid amount in the chamber, so that the valve member moves to a position where it uncovers a larger through-flow area of the outlet for a small liquid flow.

By means of an arrangement according to the invention, flow indicators of the type described may be made selfcleaning. Without any disturbance of the normal function of the flow indicator, the valve member may be caused to uncover a through-flow area of the outlet for a small liquid flow, when the chamber is filled with milk, which area is sufficiently large to ensure that hair and other particles accompanying the milk will leave the chamber.

Within the scope of the invention, two floats may be present in the chamber, one for operating the valve member and the other for indicating which amount of milk is present in the chamber. According to a preferred embodiment of the invention, however, a single float is used for both functions.

In the preferred embodiment of the invention, the outlet for a large liquid flow is constituted by an overflow outlet in the chamber arranged at a certain level above the chamber bottom. The outlet for a small flow is constituted by an opening at the chamber bottom, the valve member having a substantially conical portion arranged to be moved axially within this opening.

According to a particular embodiment of the flow indicator, both of the chamber outlets are situated at the chamber bottom, the arrangement being such that the outlet for a small flow is created between the valve member and an edge surrounding the outlet for a large liquid flow. The valve member may then be arranged to leave an annular opening between the valve member and the said edge, when only a small liquid flow passes through the chamber, which annular opening will then constitute the constantly open outlet for a small liquid flow. Preferably, however, the outlet for a large liquid flow is surrounded by a seat against which the valve member is arranged to abut, at least one of the seat and the valve member having a recess so shaped that a passage is formed past the seat when the valve member abuts against the latter.

Figure 3:
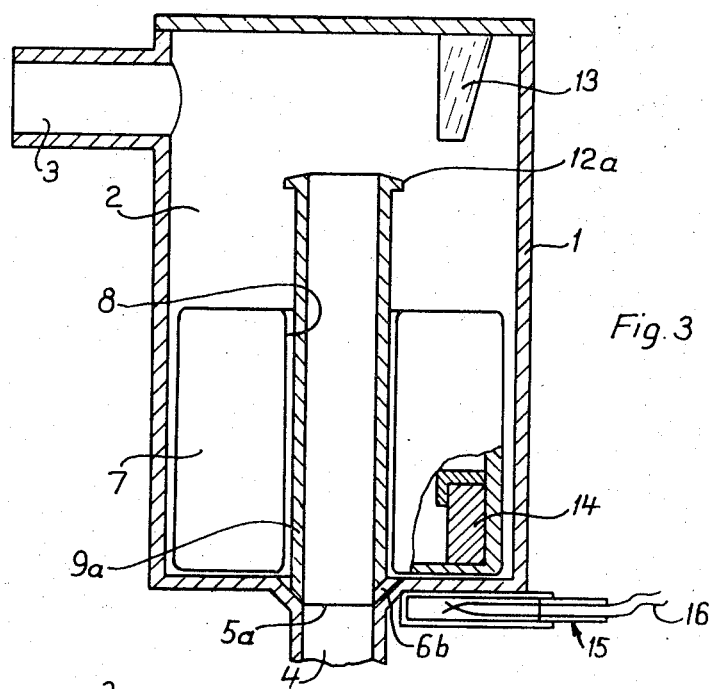
Figure 4:
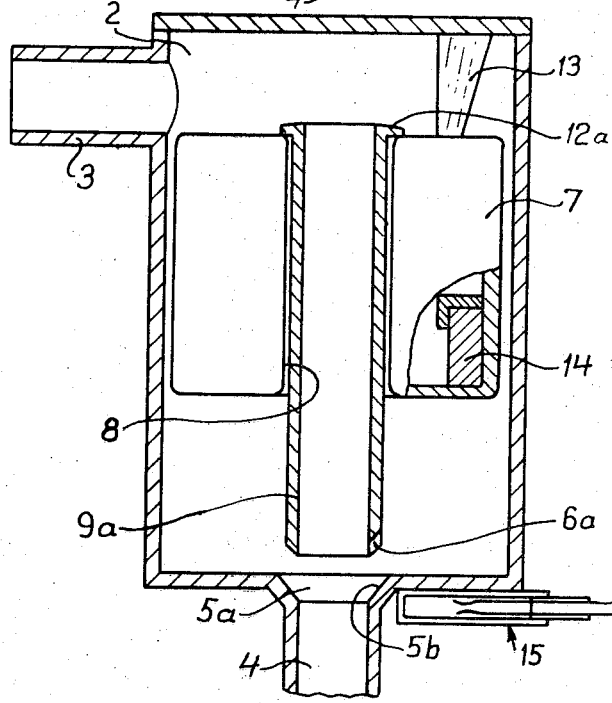

The invention is described below with reference to the accompanying drawings. In the drawings, FIGS. 1 and 2 are vertical sectional views of a first embodiment and FIGS. 3 and 4 are similar views of a second embodiment of the invention.

Figure 2:
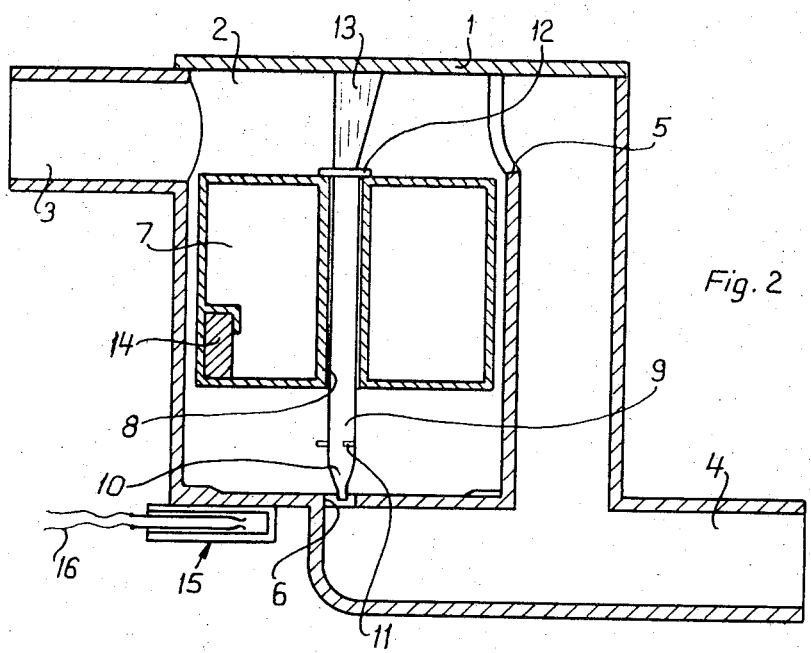

In FIGS. 1 and 2, the flow indicator comprises a housing 1 forming a chamber 2. The chamber 2 is arranged to receive a liquid flow through an inlet conduit 3 and has two outlets leading to an outlet conduit 4. One outlet has the form of an overflow outlet 5 situated in the upper part of the chamber; and the other outlet, having substantially less capacity, is constituted by an opening 6 in the chamber bottom.

In the chamber 2 is a float 7 having a vertical hole 8 extending therethrough. Arranged in this hole 8 is a cylindrical stem 9 axially movable relative to the float 7 and the housing 1. The lower portion 10 of this stem 9 is conical and forms a valve member in the chamber bottom outlet 6. The stem 9 has a smaller diameter than the outlet opening 6, so that the latter will never be entirely closed. By a pin 11, the axial downward movement of the stem 9 through the outlet opening 6 is limited. At its upper part, the stem 9 has a flange 12 arranged to be engaged by the float 7 when the latter moves upward in the chamber due to accumulation of liquid therein. Depending from the upper wall of the chamber is a member 13 which limits the upward movement in the chamber of the stem 9 and thus also the float 7, so that the chamber inlet 3 and overflow outlet 5 will be constantly kept open.

In the lower part of the float 7 is a magnet 14 which cooperates with a micro-switch 15 situated on the outside of the housing 1. The micro-switch 15, shown only schematically, is included in an electrical circuit 16 which also includes an indicating means of any suitable kind, for instance an electric lamp (not shown). The magnet 14 in the float 7, depending on its position in the chamber, causes the switch 15 to keep the circuit 16 either closed or broken. In FIG. 1 the float 7 is shown in a position where the circuit is closed, which thus indicates that the chamber 2 is substantially empty. In FIG. 2 the float 7 is shown in a position where the circuit is broken, which indicates that the chamber is substantially filled with liquid.

When only a small liquid flow enters the chamber 2 through the conduit 3, all liquid leaves the chamber through the part of the bottom outlet opening 6 that is not covered by the valve member 10, i.e., the lower portion of the stem 9. When a liquid flow enters the chamber at a rate so large that the capacity of the outlet 6 is insufficient, the chamber 2 is filled by liquid, which will then leave the chamber 2 through the overflow outlet 5. When the liquid surface in the chamber rises, the float 7 moves upward and the valve member 10 is lifted from the outlet opening 6, the free through-flow area of which will then be larger. Any particles which during the small liquid flow through the chamber were collected in the vicinity of the outlet opening 6, but which were not able to discharge through the annular opening between the valve member 10 and the edge defining the outlet opening 6, will now leave the chamber through this outlet opening. If particles should entirely block the annular opening between the valve member 10 and the edge forming the outlet opening 6, this obstacle will also be removed even if the liquid flow to the chamber 2 remains small. When more and more liquid is collected in the chamber 2 due to such blocking of the outlet opening 6, the float 7 will be lifted by this liquid and in turn will lift the valve member 10, so that the latter will leave a larger free through-flow area of the outlet 6. This through-flow area will finally be so large that the particles may pass through the opening 6. Consequently, the flow indicator is self-cleaning under operation and may be freed from foreign particles under all circumstances in connection with a through-flow of cleaning solution.

In FIGS. 3 and 4, the flow indicator has a housing 1, a chamber 2, an inlet conduit 3, an outlet conduit 4, a float 7 with a vertical hole 8, a member 13 for limiting the upward movement of the float 7, and a magnet 14 coacting with a micro-switch 15 which is included in an indicating circuit 16. The two outlets from the chamber 2 and the valve member which is arranged to cooperate with the chamber outlet for a small liquid flow are somewhat differently formed in this embodiment, however. The two chamber outlets in this embodiment are united to one single opening in the chamber bottom. This opening, designated 5a, is surrounded by a seat 5b for the lower end surface of a vertical pipe 9a which is axially movable relative to the float 7 and the housing 1. This end surface is conical and has a radial recess 6a (FIG. 4) which forms a passage 6b past the seat 5b when the pipe end surface abuts the seat (FIG. 3).

In the operation of the flow indicator according to FIGS. 3 and 4, when only a small liquid flow enters the chamber 2 through the conduit 3, all of the liquid leaves the chamber through the passage 6b. When a flow enters the chamber 2 at a rate so large that the capacity of the passage 6b is insufficient, the chamber 2 becomes filled with liquid. The float 7 will thus be lifted upward and eventually will lift the pipe 9a by engaging its flange 12a, whereby the entire opening 5a in the chamber bottom will be uncovered (FIG. 4) so that the liquid may flow out of the chamber that way. The course of operation when the passage 6b is blocked by particles will be analogous to the previously described course of operation when the free part of the outlet opening 6 is blocked in the embodiment according to FIGS. 1 and 2. If the pipe portion 9a should stick in the position shown in FIG. 3, liquid can leave the chamber through the upper end of the pipe 9a. It will be apparent that the pipe 9a functions as a valve member in co-operation with seat 5b.

I claim:

1. A flow indicator comprising a housing forming a chamber for receiving a liquid flow, said housing having means forming a constantly open outlet located at the bottom of said chamber, means for maintaining said bottom outlet with a reduced through-flow area for only a relatively small liquid flow, whereby the liquid surface in the chamber is kept at a low level when a relatively small liquid flow enters the chamber, and for increasing said throughflow area in response to rising of said liquid to a high level due to a relatively large liquid flow entering the chamber, said means including a valve member coacting with said bottom outlet and movable between a first position where it maintains said reduced area and a second position where it uncovers a larger through-flow area of said outlet, said means also including a float in the chamber associated with said valve member and operable by said rising liquid level to bias the valve member from said first to said second position, and a device for indicating which of said levels prevails in the chamber.

2. The indicator of claim 1, in which the float is movable relative to said indicating device and includes means for operating said device.

3. The indicator of claim 1, in which the valve member has a substantially conical part movable axially in said bottom outlet.

4. The indicator of claim 1, in which said housing includes means forming a second outlet from said chamber located above the level of said bottom outlet and operable to discharge liquid when the liquid rises to a high level due to said relatively large liquid flow entering the chamber.

5. The indicator of claim 1, in which said bottom outlet, in said second position of the valve member, has sufficient capacity to discharge said relatively large liquid flow entering the chamber.

6. The indicator of claim 5, in which said bottom outlet is formed by a seat against which the valve member is adapted to abut, at least one of said seat and valve member having a recess forming a passage past the seat when the valve member abuts the seat.

* * * * *